United States Patent [19]
Shiota

[11] Patent Number: 5,098,671
[45] Date of Patent: Mar. 24, 1992

[54] OZONIZER UTILIZING A MAGNETIC FIELD

[75] Inventor: Hirokazu Shiota, Tokyo, Japan

[73] Assignee: ODS Corporation, Japan

[21] Appl. No.: 649,665

[22] Filed: Feb. 1, 1991

[51] Int. Cl.⁵ .............................................. B01J 19/12
[52] U.S. Cl. ................................................ 422/186.07
[58] Field of Search ............ 422/186, 186.03, 186.04, 422/186.21, 186.07

[56] References Cited
U.S. PATENT DOCUMENTS 4,495,040  1/1985  Panico .................................. 204/155
4,666,679  5/1987  Masuda et al. .................... 422/186.2

Primary Examiner—Brooks H. Hunt
Assistant Examiner—Daniel J. Jenkins
Attorney, Agent, or Firm—Lerner, David, Littenberg, Krumbolz & Mentlik

[57] ABSTRACT

In construction of a contact-type ozonizer, one or more discharge electrodes are arranged substantially upright on a planar dielectric facing an electric field via magnetic attraction. Magnetic attraction provided stable and strong hold on the discharge electrodes without posing any excessive mechanical stress on the dielectric, upright arrangement of the discharge electrodes facilitates high rate of heat radiation and oxygen seizure is carried out in the most intensive zone of a magnetic field.

22 Claims, 4 Drawing Sheets

OZONIZER UTILIZING A MAGNETIC FIELD

BACKGROUND OF THE INVENTION

The present invention relates to an improved ozonizer, and more particularly relates to improvements in a contact-type ozonizer having one or more discharge electrodes and one or more counterpart electrodes for ozonization of supplied gas via contact with a discharge field generated by the cooperating electrodes.

Ozonizers on the market are roughly classified into two major types, i.e., non-contact type ozonizers and contact type ozonizers. In the case of a non-contact type ozonizer, a discharge electrode is arranged out of contact with a dielectric whereas, in the case of a contact type ozonizer, a discharge electrode is arranged in contact with a dielectric. In both types of ozonizers, a material gas introduced into an ozonization chamber is ionized via contact with a discharge field generated by electrodes disposed in the chamber.

In construction of a typical conventional non-contact type ozonizer, a layer of counterpart electrode is formed via, for example, chemical deposition on the inner surface of a tubular dielectric, and this tubular dielectric is surrounded by a tubular discharge electrode while leaving an elongated cylindrical ozonization chamber in between. This ozonization chamber is provided at one longitudinal end with an inlet and at the other longitudinal end with an outlet for material gas. The discharge electrode and counterpart electrode are electrically connected to a common high voltage generator. A cooling chamber is arranged around the tubular discharge electrode and provided with an inlet and an outlet for a cooling medium such as water.

During operation, the high voltage generator applies high voltages to the electrodes in order to generate a discharge field within the ozonization chamber. A material gas such as air or oxygen is introduced into the ozonization chamber through the inlet. During travel from the inlet to the outlet the gas is ionized through contact with the discharge field within the ozonization chamber. Ionized gas is put out of the ozonization chamber through the outlet.

In order to assure appreciable ozonization of the material gas in such a non-contact type ozonizer, the relatively large distance between the discharge electrode and the counterpart electrode necessitates application of an extremely high voltage up to higher than 10 KV and, accordingly, requires use of a large sized voltage generator. In addition, the relatively large capacity of the discharge electrode tends to lessen operation of the cooling system, making it difficult to remove heat generated by the discharge field. The low cooling effect naturally results in low ozonization efficiency.

The contact type ozonizer was proposed in an attempt to remove such inherent drawbacks of the non-contact type ozonizer. In one typical construction of the conventional contact type ozonizer, a counterpart electrode is deposited on or embedded in one face of a thin planar dielectric and one or more discharge electrode foils are arranged on the other face of the dielectric. The electrodes are electrically connected to a common high voltage generator and the unit is encased within a housing to define an ozonization chamber for, as in the case of the non-contact type, passage of material gas. The operation is principally the same as that of the non-contact type.

Reduced distance between electrodes in this contact type allows use of relatively low voltage for generation of the discharge field and use of a small size voltage generator. Due to this advantage, the contact type has significantly penetrated into the marketplace. Despite this merit, the foil type discharge electrode is vulnerable to damage during long periods of use. In addition, direct contact of the discharge electrodes with the dielectric of relatively low thermal conductivity tends to incur continued presence of heat generated by discharge in the discharge field, thereby barring a further rise in ozonization efficiency.

Because of the foregoing, raising ozonization efficiency is the greatest demand in the field of gas ozonization. In an attempt to satisfy such a demand, use of a pulsatile voltage is proposed for generation of a discharge field. It was observed, however, that gas ozonization takes place only during the very short initial period of pulsatile voltage application and continued application of the voltage causes undesirable heat generation. In addition, when air or oxygen is used for the material gas, such heat generation is liable to cause production of harmful nitrogen oxides. Further, heat remaining in the discharge field in the ozonization chamber tends to decompose ozones once they are generated, thereby lessening the efficiency of total ozonization.

Considering ozonization is carried out during the initial period of pulsatile voltage application, it is also proposed to employ pulsatile voltage at high frequencies. Experimental tests have confirmed, however, that a rise in frequency lowers ozonization efficiency. This is believed to be caused by the fact that generation of heat by electric discharge is followed by subsequent discharge before its diversion to other locations and, as a consequence, heat accumulation takes place in the discharge field and newly formed ozones are destroyed by the subsequent discharge. In addition, use of pulsatile voltage at discharge is inevitably accompanied with vibration of the system which often causes destruction of the dielectric which is typically low in mechanical strength.

SUMMARY OF THE INVENTION

It is thus the object of the present invention to raise the operational efficiency of an ozonizer.

In accordance with the basic aspect of the present invention, a containment means comprising a dielectric and at least one discharge electrode made of a magnetic substance defines an ozonization chamber, a magnetic field generator fixes the position of the discharge electrode via attraction by the magnetic field, and a counterpart electrode cooperates with the discharge electrode to create an electric field upon application of voltage across the electrodes.

In one aspect of the present invention, the counterpart electrode is disposed outside of the ozonization chamber and is in contact with the dielectric which may be planar. Also, the magnetic field generator is on the same side of the dielectric as the counterpart electrode.

In another aspect of the present invention, the discharge electrode comprises a planar base with a plurality of substantially parallel leg portions projecting from the base such that a plurality of substantially parallel ozonization chambers are defined by portions of the base, legs and dielectric.

In another aspect of the present invention, the discharge electrode comprises a planar base with a plurality of substantially parallel leg portions projecting from the base, and the containment means comprises a housing means for cooperating with the magnetic field generator to fix the position of the discharge electrode. Thus arranged, a plurality of ozonization chambers are defined by a portion of the discharge electrode base, at least two leg portions of the discharge electrode, and a portion of the housing means.

In another aspect of the present invention, the containment means further comprises a housing means for coooperating with the magnetic field generator to fix the position of the discharge electrode, and the majority of the surface of the discharge electrode lies in a plane which is substantially perpendicular to the dielectric.

In another aspect of the present invention, the discharge electrode has a spiral configuration, thus defining a spiral ozonization chamber.

In another aspect of the present invention, the discharge electrode is comprised of a plurality of discharge electrode portions, and the ozonization chamber is comprised of a plurality of ozonization chambers defined by at least one of the discharge electrode portions.

In another aspect of the present invention, the magnetic field generator is a permanent magnet.

In another aspect of the present invention, the dielectric comprises a cylindrical chamber, and the discharge electrode is disposed within the cylindrical chamber.

In another aspect of the present invention, at least one ozonization chamber has an inlet and an outlet disposed at opposite ends thus allowing material gas to be fed and removed, respectively, from the ozonization chambers.

In another aspect of the present invention, the leg portions of the discharge electrode are corrugated.

In another aspect of the present invention, the discharge electrode fits within a corrugated groove disposed on the housing means.

DESCRIPTION OF THE PREFERRED EMBODIMENTS

Figure 1:
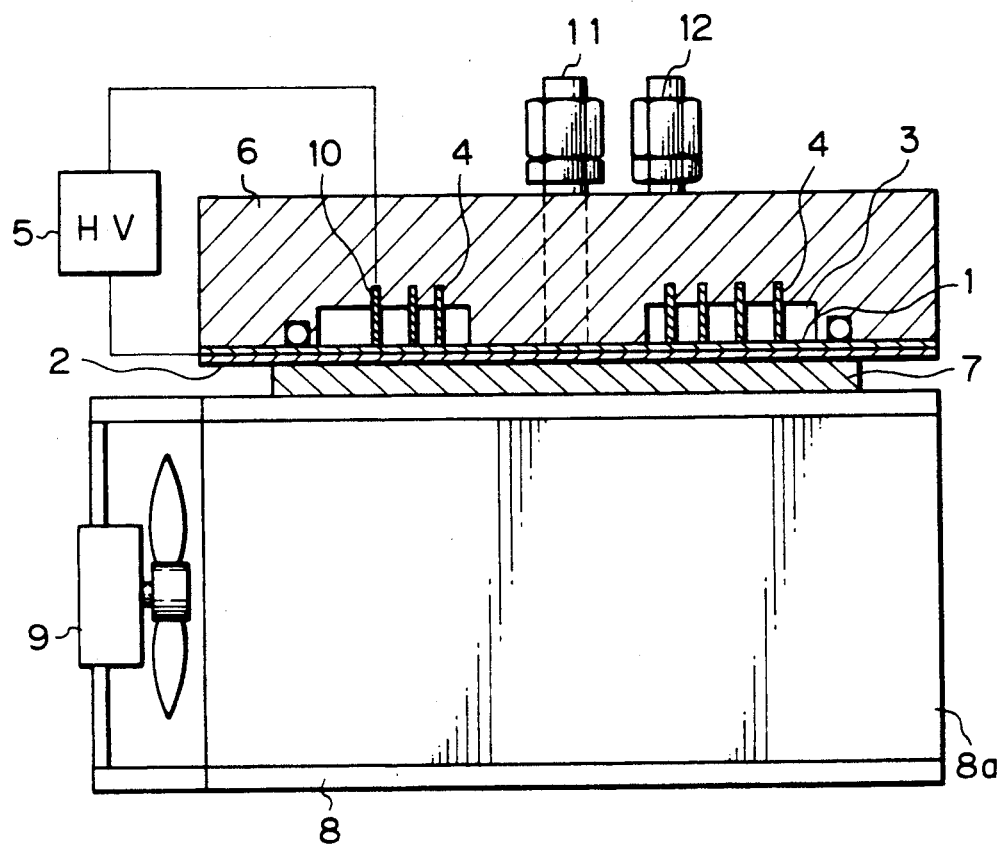
FIG. 1 is a side view, partly in section of one embodiment of the ozonizer in accordance with the present invention.

One embodiment of the ozonizer in accordance with the present invention is shown in FIG. 1, in which a housing 6 defines a cylindrical ozonization chamber 3 on a planar dielectric 1. A planar magnetic field generator 7 is attached to the bottom face of the dielectric 1 and a discharge electrode 4 is arranged substantially upright on the top face of the dielectric 1 via attraction by the magnetic field generator 7. The discharge electrode 4 may be perpendicular to the flat surface of the dielectric 1, or the discharge electrode 4 may be slightly inclined.

Preferably, a ceramic or glass plate which is 2 mm thick or less is used for the dielectric 1. In this embodiment, a ceramic plate containing 90% or more alumina may be used for the dielectric.

The magnetic field generator 7 is generally made of a permanent magnet or an electromagnet. Inasmuch as the face of the dielectric 1 in contact with the generator 7 generates heat at voltage application, it is preferable, for high cooling effect, to use a permanent magnet which is relatively thin in construction but generative of an intensive magnetic field. In the case of this embodiment, the generator may be made of a neodymium permanent magnet of more than 1000 Gauss per 1 $mm^2$. When an electromagnet is used for the generator 7, the winds of its coils must be increased to obtain an intensive magnet field and such a coil of increased winds generates much heat, in addition to poor contact with the dielectric 1. Therefore, use of an electromagnet necessitates employment of separate means for cooling the coil and the dielectric 1.

The discharge electrode is made of a magnetic substance durable against oxidation from produced ozones. For example, the discharge electric may be made of stainless steel, iron plated with chromium or nickel. In this embodiment, a chrome-plated iron ribbon of 10 to 300 microns thick and 2 to 10 mm wide may be used.

Figure 2:
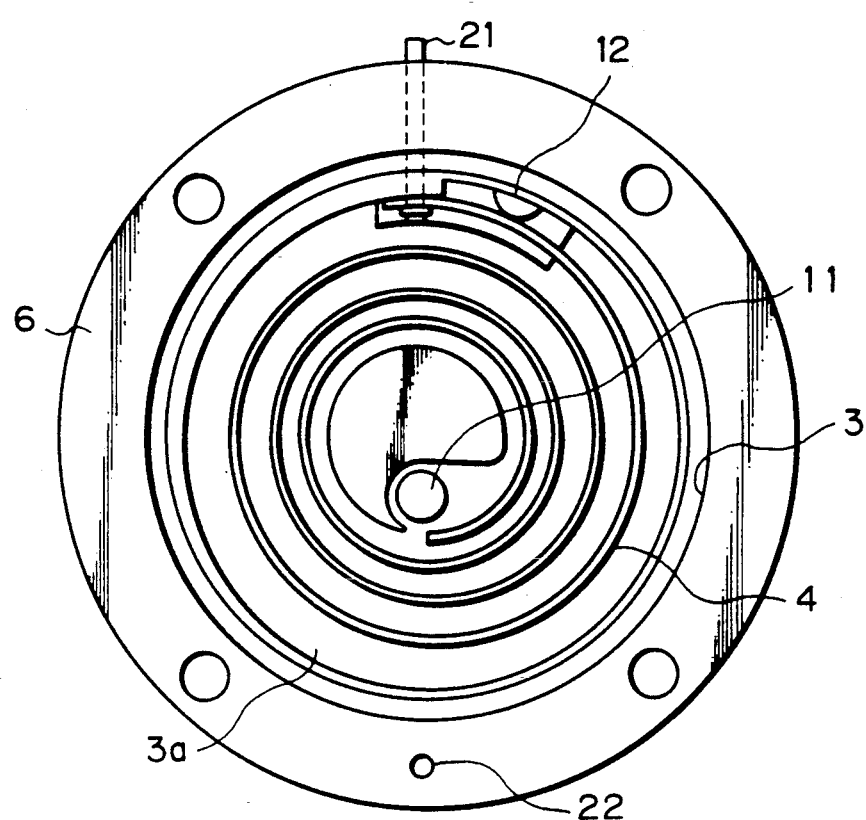
FIG. 2 is a bottom view of the ozonizer shown in FIG. 1.

As seen in FIG. 2, the discharge electrode 4 has a spiral construction to define a spiral flow path 3a for material gas. Such a spiral construction facilitates self-standing of the discharge electrode 4. More preferably, a spiral groove 10 is formed in the ceiling of the ozonization chamber 3 in order to receive the top edge of the discharge electrode 4 for better self-standing purposes. The housing 6 is provided near its center with an inlet 11 and, near its periphery, with an outlet 12 for the material gas to be introduced into and passed through the ozonization chamber 3.

A planar counterpart electrode 2 is arranged between the dielectric 1 and the magnetic field generator 7 in contact with the bottom face of the dielectric 1. The discharge electrode 4 and the counterpart electrode 2 are electrically connected to a common high voltage source 5. In this embodiment, the voltage source 5 supplies pulsatile voltage of 2 to 10 KV and 3 to 5 KHz. In the preferred embodiment illustrated in FIG. 2, a lead 21 is used for connection of the discharge electrode 4 and a lead, not shown, for the counterpart electrode 2 through an aperture 22.

Figure 3:
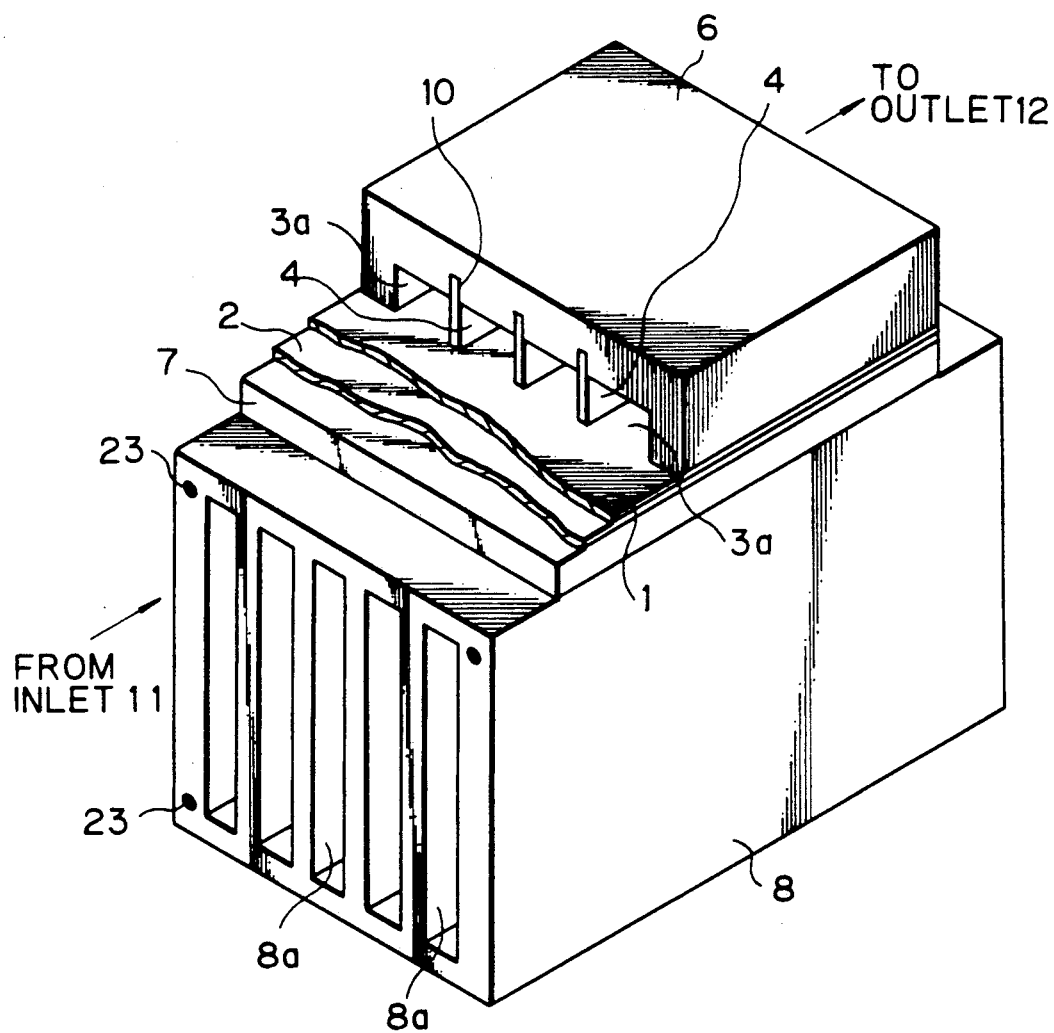
FIG. 3 is a perspective view, partly cut out, of another embodiment of the ozonizer in accordance with the present invention.

A cooler unit 8 is arranged below the above-described arrangement. The cooler unit is common to different embodiments of the invention, as seen in FIGS. 1 and 3. More specifically, the cooler unit 8 includes a fan 9 attached to the side wall of the unit 8 via screw holes 23 and a plurality of radiator vanes 8a extending below the magnetic field generator 7.

In operation, high voltage, preferably pulsatile, is applied to the electrodes 2 and 4 by the voltage source 5 for generation of an electric field. Material gas in introduced into the ozonization chamber 3 via the inlet 11. During travel through the spiral flow path 3a defined by the discharge electrode 4, oxygen or another material gas is ozonized by the electric field and ozonized gas is put out of the ozonization chamber 3 via the outlet 12.

Since the discharge electrode 4 is made of a magnetic substance, the discharge electrode 4 is kept in tight contact with the underside dielectric 1 due to attraction by the magnetic field generator 7. Because of the relatively thin construction, it is very difficult to mechanically hold the discharge electrode 4 in the upright position and insufficient mechanical holding force would leave local gaps between the discharge electrode 4 and the dielectric 1, thereby preventing uniform discharge. In addition, vibration of the discharge electrode 4 may destroy the dielectric 1. On the other hand, excessive mechanical holding force would destroy the dielectric 1, especially any local concentration of stress. In addition, buckling of the discharge electrode 4 would allow growth of local gaps between the discharge electrode 4 and the dielectric 1. Holding by magnetic attraction as employed in the present invention produces uniform holding force and, as a consequence, assures tight contact between the discharge electrode 4 and the dielectric 1 without any mechanical damage to the latter.

The discharge electrode 4 is held substantially upright on the dielectric 1 in close proximity to the counterpart electrode 2. Thanks to this upright position, the upper portion of the discharge electrode 4 functions as a sort of radiator vane for better cooling effect.

An added benefit of the magnetic field of the present invention is the theoretical ability of the field to facilitate seizure of oxygen in the material gas. Oxygen has a tendency of being attracted by an intensive magnetic field. Concentration of magnetic fluxes generated by the generator 7 is most intensive near the lower end of the discharge electrode 4 and, as a consequence, oxygen in the material gas is expected to be caught in this area. In other words, oxygen concentration is maximum in the vicinity of the discharge electrode 4. Thus, when air is used as the material gas, condensed oxygen is ozonized in this area while suppressing production of nitrogen oxides. Upon ozonization, the oxygen loses its magnetic nature and is placed out of attraction by the magnetic field around the discharge electrode 4. Ozones so produced leave the magnetic and discharge fields immediately after their ozonization without returning to oxygen due to the influence of the discharge field.

There is no established experimental endorsement for such a theoretical inference. A series of experimental tests were, however, conducted by the inventor of the present invention in order to confirm presence of the above-described increased oxygen seizure in the system of the present invention. In the tests, the amount of voltage initiating corona discharge was measured, this point being the most effective in causing ozonization. When the magnetic field generator 7 is used in accordance with the present invention, the value of the resultant corona discharge initiating voltage was about 20% lower than when the magnetic field generator is not used. It was thus confirmed that the magnetic field functions as a sort of trigger for facilitating electric discharge. Such a trigger function is believed to stabilize electric discharge, increase discharge density and enlarge the discharge field.

In another preferred embodiment as shown in FIG. 3, a plurality of discharge electrodes 4 are held upright on the dielectric 1 and in parallel to each other to define straight flow paths 3a. The material gas inlet 11 is located near one longitudinal end of the flow paths and the ozonized gas outlet 12 is located near the other longitudinal end of the flow paths.

Figure 4:
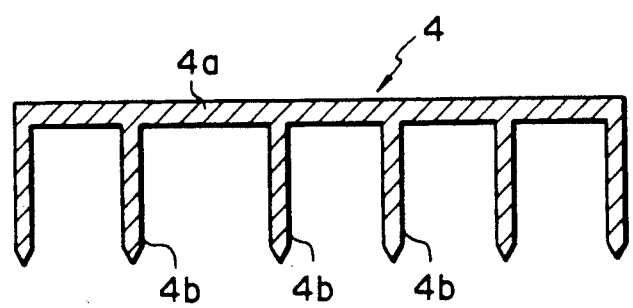
FIG. 4 is a sectional side view of one embodiment of the discharge electrode used for the ozonizer in accordance with the present invention.

As a substitute for the plurality of discharge electrodes 4, a discharge electrode 4 such as shown in FIG. 4 is also usable. This discharge electrode 4 is made up of a plurality of parallel leg sections 4b for defining flow paths 3a, and a connecting section 4a for connecting the leg sections 4b. In this case, the connecting section 4a may operate as a substitute for the housing 6.

Figure 5:
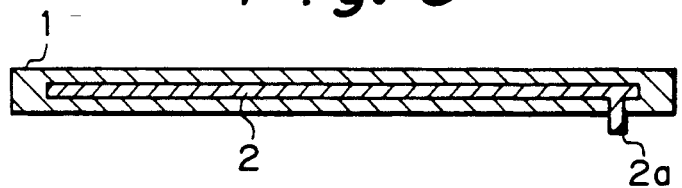
FIG. 5 is a sectional side view of one embodiment of the dielectric and the counterpart electrode used for the ozonizer in accordance with the present invention.
Figure 6:
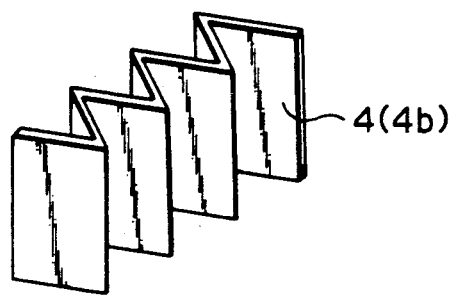
FIG. 6 is a perspective view of another embodiment of the discharge electrode.
Figure 7:
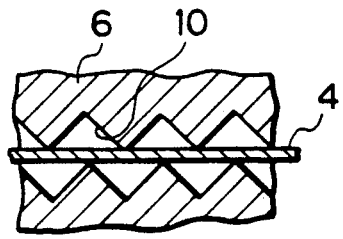
FIG. 7 is a bottom view of the arrangement for supporting the discharge electrode.

In the case of the embodiments shown in FIGS. 3 and 4, the discharge electrodes 4 or the leg section 4b of the discharge electrode 4 may be provided with a corrugated construction to provide stable self-standing, such as shown in FIG. 5. Alternatively, a corrugated groove 10 in the housing 6, such as shown in FIG. 7, may be combined with a straight discharge electrode 4.

Figure 8:
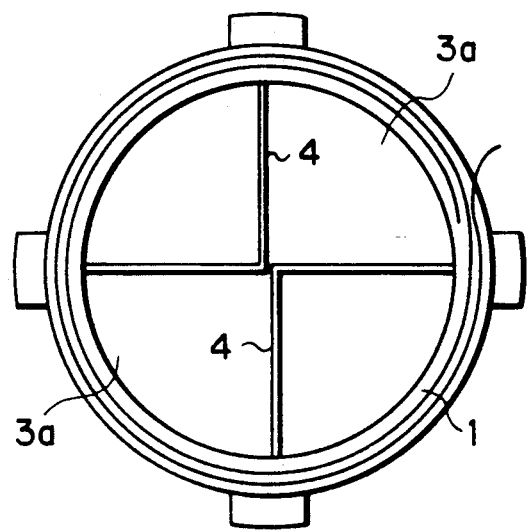
FIG. 8 is a side view of the other embodiment of the discharge electrode.
Figure 9:
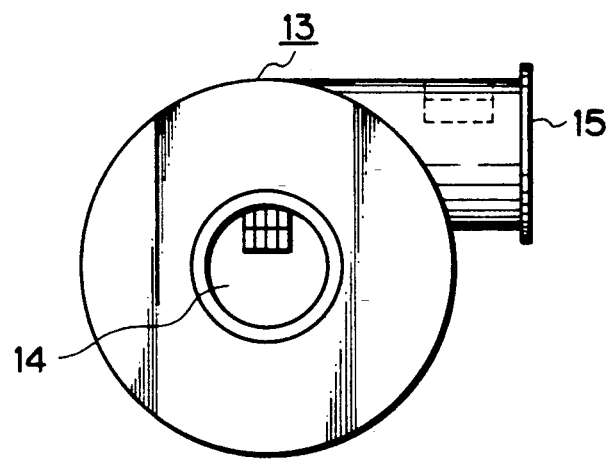
FIG. 9 is a front view of still another embodiment of the discharge electrode.

In a further embodiment shown in FIG. 8, a cylindrical dielectric 1 is used in combination with two bent discharge electrodes 4 defining flow paths 3a of a sectorial cross-sectional profile. In the embodiment shown in FIG. 9, a fan 13 itself defines an ozonization chamber for accommodating the arrangement shown in FIG. 1 except for the fan 9. Material gas is introduced into the system through a fan inlet 14 and put out through a fan outlet 15.

In general operation of an ozonizer, there is a change-over point for ozone production in the system. That is, an increase in applied voltage is initially accompanied with a corresponding increase in ozone production. However, once a certain voltage is reached, a reduction in subsequent ozone production is caused. This certain voltage value is called a change-over point. In particular, when air is used for the material gas, this change-over point is lower than that for pure oxygen and abrupt production of nitrogen oxide is observed when the applied voltage exceeds this change-over point. In the case of the ozonizer in accordance with the present invention, its change-over point is higher than those for the conventional ozonizers and, as a consequence, application of high voltage in an intensive magnetic field does not cause undesirable increase in production of nitrogen oxide.

The heat radiation by the discharge electrodes affects ozone production because an acceptable mode of ozone production can be observed even in the case of conventional ozonizers once large scale cooling is employed. In the case of the present invention, tight contact of the discharge electrodes to the dielectric and the upright mounting of the discharge electrodes are believed to facilitate good heat radiation.

The above-described trigger function provided by use of the magnetic field generator in accordance with the present invention allows good electric discharge even with a low electric voltage. No substantial production of nitrogen oxide is observed with use of such low electric voltage. For example, the concentration of nitrogen oxide produced at an electric voltage of 5 KV is at most 0.5 ppm, or lower, in the case of the present invention. With the same level of voltage, the concentration is 40 ppm or higher in the case of conventional ozonizers. As a consequence, the ozonizer in accordance with the present invention is well suited for home sterilization and deodorization.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An ozonizer comprising
   containment means defining an ozonization chamber for permitting the flow of a material gas, said containment means comprising a dielectric having a first surface and a second surface, and a discharge electrode of a magnetic substance in contact with said first surface of said dielectric,
   magnetic field generating means for fixing the position of said discharge electrode in contact with said dielectric,
   a counterpart electrode in contact with said first surface of said dielectric and not in direct contact with said discharge electrode, and
   voltage means for applying voltage to said discharge and counterpart electrodes, application of said voltage causing an electric field to at least partially cross through said ozonization chamber.

2. An ozonizer as defined in claim 1, wherein
   said counterpart electrode is disposed outside of said ozonization chamber.

3. An ozonizer as defined in claim 2, wherein
   said dielectric is planer,
   said counterpart electrode is in contact with said second surface of said dielectric, and
   said magnetic field generating means is located on said second surface of said dielectric.

4. An ozonizer as defined in claim 3, wherein
   said discharge electrode comprises a planar base portion and a plurality of substantially parallel leg portions projecting from said planar base portion, said leg portions in contact with said first surface of said dielectric, whereby said ozonization chamber comprises a plurality of substantially parallel ozonization chambers, each defined by at least a portion of said planar base portion of said discharge electrode, by at least two said leg portions of said discharge electrode, and by at least a portion of said dielectric.

5. An ozonizer as defined in claim 3, wherein
   said discharge electrode comprises a planar base portion and a plurality of substantially parallel leg portions projecting from said planar base portion,
   said containment means further comprises housing means for cooperating with said magnetic field generating means to fix said position of said discharge electrode, said housing means being in direct contact with said discharge electrode, whereby said ozonization chamber comprises a plurality of substantially parallel ozonization chambers, each defined by at least a portion of said planar base portion of said discharge electrode, by at least two said leg portions of said discharge electrode, and by at least a portion of said housing means.

6. An ozonizer as defined in claims 4 or 5 further comprising
   at least one material gas inlet for feeding material gas into at least one of said plurality of ozonization chambers, and
   at least one material gas outlet for removing the ozonized material gas from at least one of said plurality of ozonization chambers.

7. An ozonizer as defined in claims 4 or 5, wherein each of said leg portions is corrugated.

8. An ozonizer as defined in claim 5, wherein said housing means includes a corrugated groove, and said leg portions of said discharge electrode are fixed by partial insertion into said corrugated groove.

9. An ozonizer as defined in claim 3, wherein
   said containment means further comprises housing means for cooperating with said magnetic field generating means to fix said position of said discharge electrode, said housing means being in direct contact with said discharge electrode, and
   the majority of the surface of said discharge electrode lying in a plane which is substantially perpendicular to said dielectric.

10. An ozonizer as defined in claim 9, wherein
    said discharge electrode has a spiral configuration and is disposed in contact with said first surface of said dielectric, whereby said ozonization chamber has a spiral configuration.

11. An ozonizer as defined in claim 10 further comprising
    a material gas inlet for feeding material gas substantially into the center of said ozonization chamber, and
    a material gas inlet for feeding material gas substantially into the center of said ozonization chamber, and
    a material gas outlet for removing the ozonized material gas from the peripheral edge of said ozonization chamber.

12. An ozonizer as defined in claim 9, wherein
    said discharge electrode comprises a plurality of parallel discharge electrode portions, whereby said ozonization chamber comprises a plurality of substantially parallel ozonization chambers defined by at least one of said plurality of discharge electrode portions.

13. An ozonizer as defined in claim 12 further comprising
    at least one material gas inlet for feeding a material gas into at least one of said plurality of ozonization chambers, and
    at least one material gas outlet for removing the ozonized material gas from at least one of said plurality of ozonization chambers.

14. An ozonizer as defined in claim 12, wherein each one of said plurality of discharge electrode portions is corrugated.

15. An ozonizer as defined in claim 8, wherein said housing means includes a corrugated groove, said plurality of discharge electrode portions are fixed by partial insertion into said corrugated groove.

16. An ozonizer as defined in claim 4, wherein said magnetic field generating means is attached to said counterpart electrode.

17. An ozonizer as defined in claim 4, wherein said counterpart electrode is embedded in said dielectric.

18. An ozonizer as defined in claims 4, 5, 9, 10, or 12, wherein said discharge electrode is comprised of a magnetic substance durable against oxidation by ozonized gas.

19. An ozonizer as defined in claims 4, 5, 9, 10, or 12, wherein said discharge electrode has a thickness ranging from about 20 to 300 microns.

20. An ozonizer as defined in claims 4, 5, 9, 10, or 12, wherein said magnetic field generating means is a permanent magnet.

21. An ozonizer as defined in claims 4, 5, 9, 10, or 12, wherein said dielectric has a thickness of up to about 2 mm.

22. An ozonizer as defined in claim 2, wherein said dielectric comprises a cylindrical chamber, and said discharge electrode is disposed within said cylindrical chamber.

* * * * *

UNITED STATES PATENT AND TRADEMARK OFFICE
CERTIFICATE OF CORRECTION

PATENT NO. : 5,098,671
DATED : March 24, 1992
INVENTOR(S) : Shiota

It is certified that error appears in the above-identified patent and that said Letters Patent is hereby corrected as shown below:

Column 8, line 21, delete "a material gas inlet for feeding material gas substantially into the center of said ozonization chamber, and"

Signed and Sealed this

Twenty-first Day of September, 1993

Attest:

BRUCE LEHMAN

*Attesting Officer*      *Commissioner of Patents and Trademarks*